No. 785,636. PATENTED MAR. 21, 1905.
F. McM. SAWYER.
MOLD FOR MOLDING ROOFING OR OTHER TILES.
APPLICATION FILED DEC. 22, 1904.
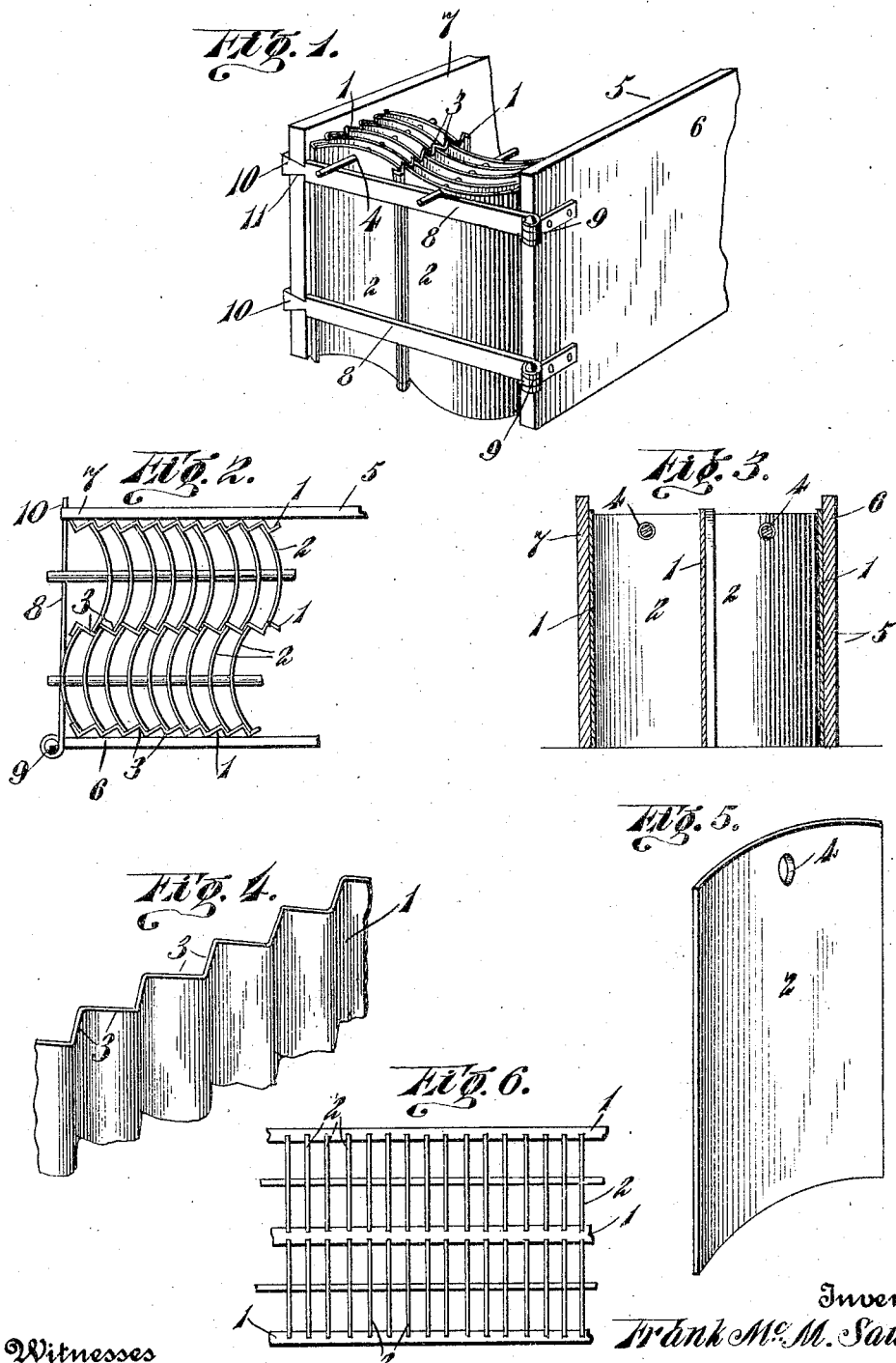
Witnesses
Eugene W. Sling
C. H. Griesbauer
Inventor
Frank McM. Sawyer
by H. B. Willson
Attorney No. 785,636.   Patented March 21, 1905.

UNITED STATES PATENT OFFICE.

FRANK McM. SAWYER, OF CHARLOTTE, NORTH CAROLINA.

MOLD FOR MOLDING ROOFING OR OTHER TILES.

SPECIFICATION forming part of Letters Patent No. 785,636, dated March 21, 1905.

Application filed December 22, 1904. Serial No. 237,948.

*To all whom it may concern:*

Be it known that I, FRANK McM. SAWYER, a citizen of the United States, residing at Charlotte, in the county of Mecklenburg and State of North Carolina, have invented certain new and useful Improvements in Molds for Molding Roofing or other Tiles; and I do declare the following to be a full, clear, and exact description of the invention, such as will enable others skilled in the art to which it appertains to make and use the same.

My invention is an improved mold for molding roofing-tiles and other like articles; and it consists in the construction and arrangement of devices hereinafter described and claimed.

The object of my invention is to provide an improved mold of this character which is adapted for molding a number of tiles simultaneously and the parts of which are adapted to be readily assembled and separated.

In the accompanying drawings, Figure 1 is a perspective view of a mold embodying my improvements. Fig. 2 is a detail top plan view of the same. Fig. 3 is a transverse sectional view of the same. Fig. 4 is a detail perspective view of one of the longitudinal mold-pieces. Fig. 5 is a similar view of one of the transverse pieces, and Fig. 6 is a detail top plan view showing a modified construction of my improved mold in which the latter is adapted for molding flat tiles.

In the embodiment of my invention I provide a suitable number of longitudinal mold-pieces 1 and of transverse mold-pieces 2. The same are preferably made of sheet metal, but may be made of any other suitable material. The longitudinal pieces 1 constitute the side walls and the longitudinal partitions of the mold, and each of the said longitudinal pieces is formed with a plurality of vertical transverse corrugations or notches 3, which may be of any required form, according to the character of the transverse mold-pieces 2 and of the form of the tiles or other articles which are to be formed in the mold. The transverse mold-pieces 2 may be curved, as shown in Figs. 1 to 5, or they may be flat, as shown in Fig. 6. They may also be of any other suitable form, according to the form of the article to be maufactured in the mold, and I do not desire to limit myself in this particular. Each of the transverse mold-pieces 2 is also preferably made of a piece of sheet metal of suitable size and shape; but the same may be made of any other suitable material. Each of the said transverse mold-pieces 2 is provided, at a suitable distance from its upper end, with an opening 4.

In using my improved mold the longitudinal mold-pieces 1 are arranged parallel with each other or with one another, accordingly as two or more of them may be employed. Where more than two of them are employed, as in the showing in Fig. 1, the outer longitudinal pieces 1 constitute the side pieces of the mold, and the intermediate piece or pieces 1 constitute the longitudinal partition or partitions of the mold. The transverse pieces 2 are placed between the pieces 1 with their side edges engaged with the notches or corrugations of the longitudinal pieces. It will be observed that the notches, corrugations, or flutes of the longitudinal pieces are of a width which is greater than the width of the transverse pieces, so that the said notches, corrugations, or flutes serve to appropriately space the said transverse pieces apart and to also form the side edges of the molded articles. The cross-pieces are so placed between the longitudinal pieces that their openings 4 aline, and a rod and rods is or are passed through said openings 4. The longitudinal and transverse pieces of the mold may be, within the scope of my invention, held together when thus assembled by any suitable means. For the purposes of this specification a frame 5 is here shown, which comprises a pair of side boards 6 7, connected together at their ends by bars 8. The bars 8 are here shown as hinged at one end, as at 9, to the side board 6 and as having their free ends provided with dovetails 10, adapted to engage similarly-shaped recesses 11 in the ends of the side board 7. The said frame, together with the mold, will of course when used be placed upon a suitable base or other support.

The mold is adapted for the molding of any suitable plastic material, such as a composition of cement, sand, and water, which may be colored to any shade desired by means of a suitable pigment which may be incorporated in the composition. While the composition is in a semifluid state it is poured into the mold from the open upper side of the latter and fills the spaces between the longitudinal pieces 1 and the transverse pieces 2 and sets in the said spaces to form tiles or other articles, which will be of a size and shape determined by the size and shape of the pieces of the mold. When the composition has set, the rods will be withdrawn from the openings 4 of the transverse pieces 2, so as to leave nail-holes in the molded articles. The parts of the mold may be readily disassembled to permit of the removal of the molded articles from between them, as will be readily understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention.

Having thus described my invention, what I claim as new, and desire to secure by Letters Patent, is—

1. A mold of the class described comprising pieces provided with notches in their opposing sides and transverse pieces to connect the first-named pieces and adapted to have their edges inserted in the notches of the first-named pieces, whereby said transverse pieces are spaced apart by the said notched pieces, the width of the notches of the latter exceeding the thickness of the transverse pieces and thereby serving to form the side edges of the molded articles.

2. A mold of the class described comprising fluted longitudinal pieces and intermediate transverse pieces having their edges inserted in the flutes of the said longitudinal pieces, the width of the said flutes exceeding the thickness of the said transverse pieces and serving to form the side edges of the molded articles.

3. A mold of the class described, comprising longitudinal pieces, transverse pieces to connect them together, means to space said transverse pieces, the latter having openings and a rod in said openings and removable from said transverse pieces to form openings in the articles molded in the spaces between said longitudinal pieces and said transverse pieces, substantially as described.

In testimony whereof I have hereunto set my hand in presence of two subscribing witnesses.

F. McM. SAWYER.

Witnesses:
 BENJ. G. COWL,
 S. A. TERRY.